(12) United States Patent
Rahme et al.

(10) Patent No.: US 9,563,251 B2
(45) Date of Patent: Feb. 7, 2017

(54) REPRESENTING A CACHE LINE BIT PATTERN VIA META SIGNALING

(71) Applicant: Intel Corporation, Santa Clara, CA (US)

(72) Inventors: Saher Abu Rahme, Shefaram (IL); Christopher E. Cox, Placerville, CA (US); Joydeep Ray, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 114 days.

(21) Appl. No.: 14/142,813

(22) Filed: Dec. 28, 2013

(65) Prior Publication Data
US 2015/0186282 A1    Jul. 2, 2015

(51) Int. Cl.
*G06F 12/08* (2016.01)
*G06F 1/32* (2006.01)

(52) U.S. Cl.
CPC ................................ *G06F 1/3225* (2013.01)

(58) Field of Classification Search
None
See application file for complete search history.

(56) References Cited

U.S. PATENT DOCUMENTS

| | | | | |
|---|---|---|---|---|
| 6,026,464 A | * | 2/2000 | Cohen ................. | G06F 13/1647 710/241 |
| 2011/0289270 A1 | * | 11/2011 | Bell, Jr. ............ | G06F 17/30899 711/112 |
| 2013/0304964 A1 | * | 11/2013 | Chu .................... | G06F 12/0246 711/103 |
| 2014/0351524 A1 | * | 11/2014 | Natarajan .......... | G06F 12/0891 711/130 |

* cited by examiner

*Primary Examiner* — Duc Doan
(74) *Attorney, Agent, or Firm* — Compass IP Law

(57) ABSTRACT

A cache controller with a pattern recognition mechanism can identify patterns in cache lines. Instead of transmitting the entire data of the cache line to a destination device, the cache controller can generate a meta signal to represent the identified bit pattern. The cache controller transmits the meta signal to the destination in place of at least part of the cache line.

19 Claims, 5 Drawing Sheets

REPRESENTING A CACHE LINE BIT PATTERN VIA META SIGNALING

FIELD

Embodiments of the invention are generally related to power management, and more particularly to dynamically measuring and estimating power performance parameters for a memory subsystem.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2013, Intel Corporation, All Rights Reserved.

BACKGROUND

The ubiquity of computing/electronic devices has caused a drive for powerful computing in smaller, portable, and more energy efficient devices. Energy efficiency is of particular interest. The functionality of computing devices is provided by various functional chips that enable the computing devices to perform their desired functions. Thus, the inter-chip communication is necessary for computing devices to perform as expected. However, presently, inter-chip communication is one of the largest factors in power consumption in many computing devices, including portable computing devices.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
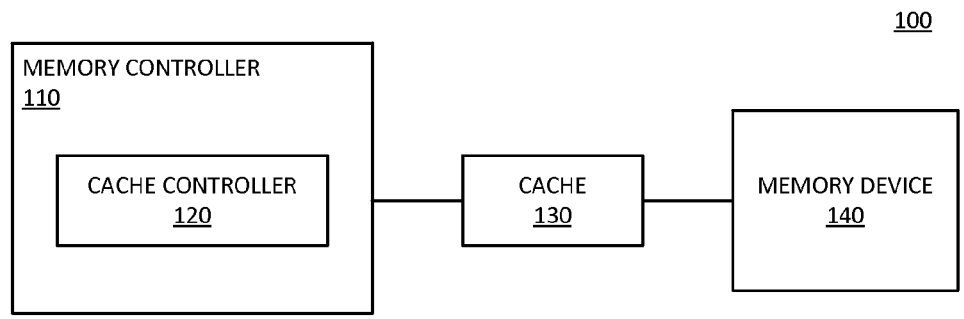
FIG. 1 is a block diagram of an embodiment of a system in which a memory controller sends a meta signal when a bit pattern is detected in a cache line.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a cache controller identifies a bit pattern in a cache line, and generates a meta signal to represent the bit pattern. The cache controller includes a pattern recognition mechanism that can identify bit patterns in cache lines. Instead of transmitting the entire data of the cache line to a destination device, the cache controller can generate the meta signal to represent the identified bit pattern. The cache controller transmits the meta signal to the destination in place of at least part of the cache line. Thus, the cache controller can prevent sending data for common bit patterns, and thus reduce average power usage of cache transactions. The average power reduction comes from reducing the transmission power by representing the bit pattern with the meta signal. In addition to reducing transmission power, it will be understood that use of the meta signaling can improve performance of I/O (input/output) transactions from the caches and/or to memory subsystems generally.

When the cache controller reads the cache line in preparation for sending the cache line to a memory or storage device, the cache controller can inspect the contents of the cache line to identify a bit pattern in the cache line. For example, some systems employ scrambling technology in which the cache controller analyzes the cache line contents to scramble the contents for security and/or to encode bit patterns that improve transition times, efficiency, or other I/O parameters. Such a mechanism could be modified to identify certain bit patterns, and represent selected bits pattern(s) with associated meta signal(s). Then the cache controller could send the meta signal instead of the data.

For example, the cache controller can be configured to identify common bit patterns. The inventors studied different platform scenarios (e.g., execution of different applications), and found highly repetitive patterns, such as all zeroes. In one embodiment, the bit pattern recognition and replacement can be applied to "chunks" of the interface, such as bytes or multiple byte segments of an interface with multiple bytes of width. The inventors found that in many cases, the bit pattern extended to the entire cache line, instead of a single byte or chunk.

Reference is made to common bit patterns. The inventors found that one of the most common bit patterns was chunks of zeroes, which consumed more than a third of all traffic in some workloads. In other workloads, such as video playback workloads, the inventors observed other bit pattern tendencies (i.e., patterns other than all zeroes). By representing the common workloads with a meta signaling mechanism, a system can significantly reduce the cache controller or memory subsystem power.

In one embodiment, a system is configured with one or more meta signaling pins or connectors on the sending device, with corresponding connectors on the destination device. Thus, a cache controller can perform meta signaling by generating a signal on a meta signaling line. In one embodiment, a system is configured with a control command that will be decoded by the destination device as being a meta signal. For example, a memory access command architecture can include a "write zeroes" command, and/or "write ones" command, or other command. The receiving device can decode the command to trigger internal logic to generate the bit pattern internally without requiring reading a data bus to obtain the data to execute the command. It will be understood that other mechanisms are possible.

Reference to memory devices can apply to different memory types. Memory devices are generally volatile memory devices. Volatile memory is memory whose state (and therefore the data stored on it) is indeterminate if power is interrupted to the device. Such devices typically require refreshing the data stored in the device to maintain state. For example, memory subsystems commonly use DRAM (dynamic random access memory) which is one example of a memory device as described herein, or some variant such as synchronous DRAM (SDRAM). Thus, the memory subsystem described herein is compatible with any of a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR4 (low power dual data rate version 4, specification in development by JEDEC as of the filing of this application), WIO2 (Wide IO2, specification in development by JEDEC as of the filing of this application), and/or others, and technologies based on derivatives or extensions of such specifications.

FIG. 1 is a block diagram of an embodiment of a system in which a memory controller sends a meta signal when a bit pattern is detected in a cache line. In one embodiment, system 100 includes elements of a memory subsystem that employs a meta signal to represent a bit pattern. A processor (not specifically shown) accesses data stored in memory device 140 to perform operations in a computing device. In one embodiment, system 100 includes elements of a central processing unit (CPU) that includes a processor with on-chip cache.

The processor will commonly cache frequently accessed data in cache 130, which has faster access time than memory device 140. Cache 130 represents an on-chip cache. Memory controller 110 can control the caching of data in cache 130, including evicting and/or synchronizing data from cache 130 to memory device 140, which is off-chip from the processor. Cache controller 120 more specifically controls the operation of cache 130, including tracking/monitoring the data. In one embodiment, cache controller 120 includes a data analyzer, which can inspect the data of a cache line of cache 130.

In one embodiment, one or both of memory controller 110 and cache 130 are located on a common die with a processor. In one embodiment, one or both of memory controller and cache 130 are implemented as separate dies from the processor, but are integrated onto a common substrate with the processor. In one embodiment, cache controller 120 is separate from memory controller 110. Memory device 140 is "off-chip" from the processor and from cache 130, and could be off-chip even if it is located in the same system packaging. Thus, inter-chip communication is necessary to exchange data between cache 130 and memory device 140. In one embodiment, just as cache controller 120 can represent a data pattern by a meta signal, memory device 140 can similarly use the meta signal to indicate the data back to memory controller 110 and cache 130, instead of sending data.

Cache 130 stores data in cache lines, which typically includes multiple bytes. In current DDR memory architectures, there can be two x64 channels, with a cache line width of 64 Bytes. Each channel typically reads or writes a full cache line at a time. Typically, the full cache line operation uses sequential bits to be transferred across a data bus, such as a burst of 8. In one embodiment, for any cache line or portion (e.g., chunk) of the cache line that has a recognized pattern, cache controller 120 can represent an entire data bus with a meta signal and keep the entire data bus quiet with only a command bus sending an operation.

It will be observed that providing specific operations based on recognized patterns is similar to static systems, which has very few operations and a great deal of repetition. Thus, the systems are commonly hard coded to perform the limited operations that are expected in the system. Contrast that with the dynamic systems of typical mobile computing devices, which are not static. As described, the system can remain flexible for such dynamic systems, while providing some specific operations for specific conditions.

Reference is made to a meta signal or to meta signaling. It will be understood that the signal can be implemented in a number of different ways consistent with embodiments described herein. In one embodiment, the meta signal is a meta bit or single signal line set by the memory controller or cache controller. The meta signal can be multiple bits or multiple signal lines to provide the meta signaling. In one embodiment, the meta signaling is performed via tagging or keeping metadata about cache lines. In one embodiment, the meta signaling is performed via a command on the command bus. In one embodiment, the meta signaling is performed through one or more designated pins or connectors between the devices. The designated pins can be dedicated pins, or could be multiplexed with another signal or with other signal lines.

Figure 2:
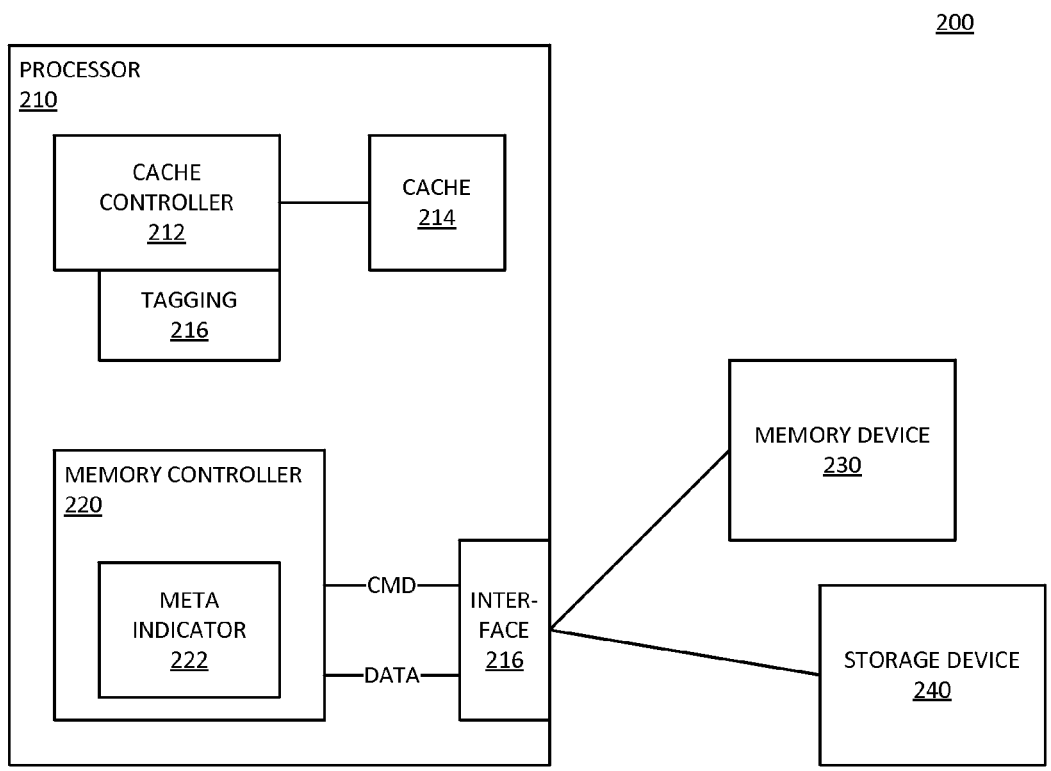
FIG. 2 is a block diagram of an embodiment of a system in which a memory controller sends a meta signal in lieu of a bit pattern to a memory device or a storage device.

FIG. 2 is a block diagram of an embodiment of a system in which a memory controller sends a meta signal in lieu of a bit pattern to a memory device or a storage device. System 200 can be one example of a system in accordance with system 100 of FIG. 1. System 200 includes processor 210, cache 214, cache controller 212, memory controller 220, and memory device 230 and/or storage device 240.

As mentioned above, common traffic patterns can make up a significant portion of traffic in a memory subsystem. For example, zero-traffic can make up a large portion of memory data traffic. In one example, an operating system (not specifically shown) that executes on processor 210 allocates new memory pages to an application (also executed by processor 210), and typically fills the new pages with zeroes to initialize the region. Cache controller 212 can be configured to perform meta signaling, expecting such behavior by the operating system. In one embodiment, all logic required to perform meta signaling exists in a CPU die implementation of processor 210, and no changes are required to an external memory chip or external storage, such as memory device 230 or storage device 240. In one embodiment, meta signaling can provide greater advantage as the interface of the memory/storage device increases, by preventing the sending of more data (a wider interface), depending on the configuration, and how the patterns are implemented.

It will be understood that the type of bit patterns that are expected to be repetitive can vary based on application and/or environment. In one embodiment, system 200 uses meta signaling for an all zeroes bit pattern. In one embodiment, system 200 uses meta signaling for an all ones bit pattern. Other bit patterns could also be present, such as alternating bits ('0101 . . . '), alternating pairs ('110011 . . . '), or other bit patterns.

In one embodiment, processor 210 is an SOC or other multi-device package. Processor 210 can include on-package cache 214. Cache controller 212 manages storage in and access to cache 214. In one embodiment, memory controller 220 is integrated with processor 210, and manages the access to external storage devices. Memory controller 220 accesses memory device 230 and/or storage device 240 via interface 216. In one embodiment, interface 216 is a wide interface, such as with stacked (e.g., Wide IO (WIO)) memory implementations.

Memory device 230 represents volatile memory resources, for example, a form of DRAM. Volatile memory resources have an indeterminate state if power is interrupted to the memory device. Storage device 240 represents nonvolatile memory resources, such as a hard drive or flash memory. Nonvolatile memory resources maintain state, even if power is interrupted to the memory device. For the sake of identification, and not limitation, nonvolatile memory is generally referred to as "storage," while "memory" can refer to a volatile memory device.

Memory controller 220 includes meta indicator 222, which can perform the meta signaling based on a determination by cache controller 212. Meta signaling can be implemented by setting one or more signal lines of interface 216. Interface 216 can include a command portion and a data portion. The separate command and data portions can be referred to as a command bus and a data bus. As bus refers to multiple signal lines that are used in conjunction to send a single item of information (either a byte or other amount of data, or a command). Interface 216 can also include other "control" signals, which in one embodiment can all be considered part of the command bus. The command indicates an operation the external memory device (230, 240) should perform, while additional control signals could provide other information about the command or data, and thus control how the external memory device receives and decodes the information sent over interface 216.

Cache 214 includes multiple lines of data. Typically, a cache line will have the same width as the interface of the external memory device of system 200. Cache controller 212 manages what is stored in cache 214, and in one embodiment is part of memory controller 220. Cache controller 212 can cache all data accessed by processor 210 for execution of an operation as part of one or more application being executed. Cache 214 is closer to the processor and has a much faster interface than the external memory device, but is much smaller. Thus, cache controller 212 determines what data should stay in cache 214, and what data should be evicted from the cache back out to an external memory device. Data stored in cache 214 can also be flushed out to the external memory device for purposes of synchronizing the data (e.g., flushing writes).

In one embodiment, cache controller 212 tags the cache lines of cache 214 as part of the management of the cache. Tagging 216 represent tagging functionality used by cache controller to manage the information cached in cache 214. In one embodiment, cache 216 is a complex tag architecture with 16 ways. In one embodiment, tagging 216 represents a separate tag controller, which can be part of cache controller 212. A tag controller can implement tags on cache lines, similar to a look up table (LUT) architecture. Thus, tagging 216 can include metadata used to manage cache lines of cache 214.

In cache controllers or non-DDR systems, a meta bit or signal can be used to identify the outgoing or incoming transaction pattern, removing the need to actually send the repetitive pattern. In one embodiment, system 200 has a large off-die memory as cache, with an on-die cache controller that uses tags or metadata to keep track of the location of the memory pages, as well as other attributes (e.g., dirty, valid, other attribute). For example, in a multi-level memory system, cache 214 is a large in-package DRAM, and cache controller 212 is on the processor die. In one embodiment, the tags represented by tagging 216 can be either fully on-die or partially (cached) on-die.

In one embodiment, cache controller 212, via tagging 216, uses a tag as a meta bit or meta signal to represent the data in the cache line. For example, the tag can be used as an entry in a LUT to determine what data is associated with the cache line. Then some or all of the cache line does not need to be sent to the external memory device. In one embodiment, tagging 216 and meta signaling allows cache controller 212 to completely remove command with certain bit patterns. Additionally, the external memory devices can take a decoded command, and save the data in any type of encoded pattern, which can improve retention in subsystem 200.

In one embodiment, cache controller 212 reads the data from cache 214 and analyzes its bit pattern. Based on an identified bit pattern, the cache controller can cause memory controller to send a special command off-chip, which is associated with the identified bit pattern. For example, a special write zeroes or write ones command could be used. A write ones command could be used for an all zeroes pattern, while a write ones command could be used for an all ones bit pattern. Other commands could be used for other bit patterns.

Figure 3:
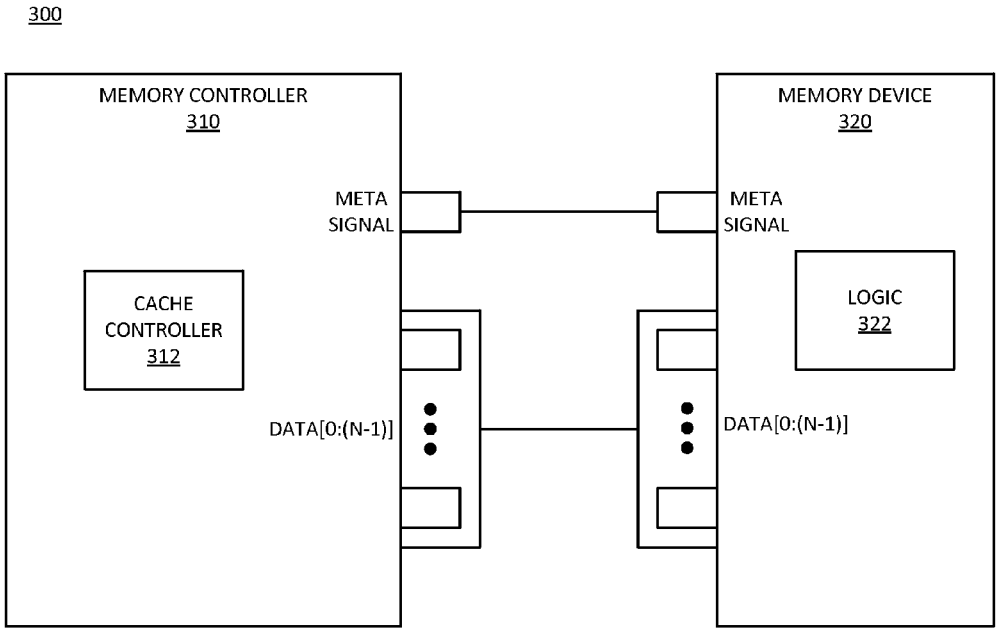
FIG. 3 is a block diagram of an embodiment of a system in which a memory controller uses a meta signal in place of a data bit pattern.

FIG. 3 is a block diagram of an embodiment of a system in which a memory controller uses a meta signal in place of a data bit pattern. System 300 illustrates certain details of an interface between a memory controller and an external memory device in a system that uses meta signaling. System 300 can be one example of elements of system 200 of FIG. 2 or system 100 of FIG. 1.

System 300 includes memory controller 310, which exchanges I/O with memory device 320. In one embodiment, memory controller 310 includes cache controller 312, which could further include a tagging controller. Memory controller 310 is on-chip with a processor, while memory device 320 is off-chip with respect to the processor. Cache controller 312 identifies bit patterns in a cache device, and represents the bit patterns with a meta bit or meta signal.

In one embodiment, meta signaling is performed via a signal line that indicates the particular bit pattern. For example, a signal line can indicate a particular pattern (e.g., a zero indication bit), or multiple signal lines can indicate one of multiple bit patterns. In one embodiment, the meta signal is not a separate signal line over a traditional interface between memory controller 310 and memory device 320. For example, the meta signal can be indicated over existing signal lines. In one embodiment, memory controller 310 indicates the meta signal with a command bus. The interface between memory controller 310 and memory device 320 is also illustrated as having a data bus, with signals 0:(N−1). The meta signal provides more efficiency to system 300 the larger N is. For large N (e.g., wide interfaces), the ability to send a meta signal indication instead of an entire data bus width of data can provide significant power savings.

In one embodiment, a cache line is larger than N, and a burst of data signals can be sent over the data bus. In the case of meta signaling, the meta signal can be set for each separate transaction in the burst. Thus, certain transactions can be sent as data (i.e., if the bit pattern of the transaction is not an "identified" pattern to be represented by the meta signal), and a subsequent transaction in the same burst can be prevented from being sent, and the meta signal sent instead. Thus, in one embodiment, meta signaling works in chunks of a cache line. In one embodiment, meta signaling is performed only for entire cache lines, instead of separate transactions.

In one embodiment, external memory device 320 includes logic 322, which allows the memory device to identify and decode meta signals. In one embodiment, memory controller 310 in cache controller 312 can store information locally that is the meta signal that identifies a particular cache line. In one embodiment, memory controller 310 sends a command and/or other meta signal to memory device 320, which can interpret the command with logic 322. Logic 322 enables memory device 320, in one embodiment, to generate the bit pattern identified by the meta signal, or generate a meta signal in place of the data to return to memory controller 310.

Figure 4:
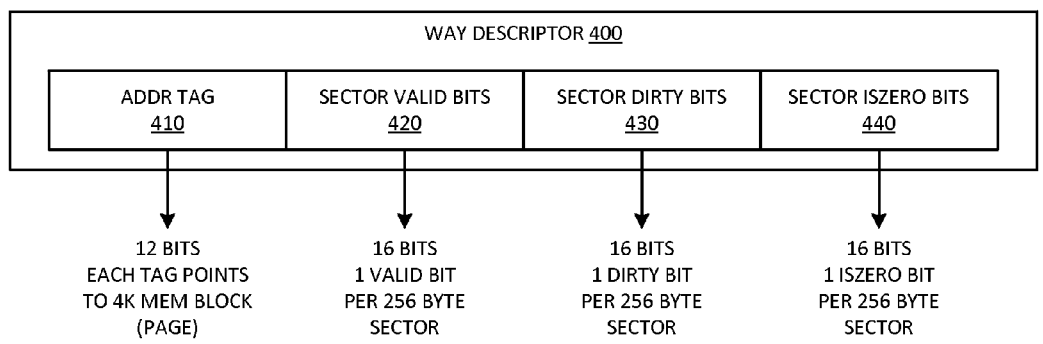
FIG. 4 is a block diagram of an embodiment of a way descriptor.

FIG. 4 is a block diagram of an embodiment of a way descriptor. In one embodiment, any of systems 100, 200, or 300 uses a way descriptor for meta signaling. In one embodiment, a cache controller encodes data in a way descriptor, which can represent the identified bit pattern. Way descriptor 400 includes multiple tag bits, which can be used to identify certain aspects of the data in a cache line. It will be understood that the example of way descriptor 400 is merely illustrative. Those of skill in the art will understand that way descriptor 400 would be configured differently for different memory configurations (e.g., different size blocks or pages, different amounts of memory, different cache line sizes, or other configuration differences).

In one embodiment, way descriptor 400 represents a 4 KB memory block or page, and the block is subdivided into different sectors. In one embodiment, way descriptor 400 includes address tag 410, which can include 12 bits, one for each 4 KB memory block. Address tag 410 can identify the location of the block in cache. In one embodiment, way descriptor 400 includes 16 sector valid bits 420. Sector valid bits 420 indicate whether a 256 byte sector contains valid data. Similarly, in one embodiment, way descriptor 400 includes 16 dirty bits, which can each indicate whether a particular 256 byte sector of the 4 KB page is dirty (written and not synchronized). Elements 410, 420, and 430 of way descriptor 400 are similar to fields that could be present in traditional way descriptors.

In one embodiment, way descriptor 400 includes one or more additional fields. For example, in one embodiment, way descriptor 400 includes sector "IsZero" bits 440. Similar to elements 420 and 430, sector IsZero bits 440 can include 16 bits, one for each 256 byte sector in the 4 KB memory block referenced by address tag 410. Sector IsZero bits 440 can indicate which sectors are filled with zeroes.

Thus, in one embodiment, way descriptor 400 includes bits not traditionally included, which can be added to indicate if a memory page or line is filled with a specific pattern. In one embodiment, a field of 16 bits can be included in way descriptor 400 that indicates which sectors have identified patterns. Way descriptor 400 could then include an additional bits (e.g., 1 bit for 2 identified patterns, 2 bits for up to 4 identified patterns, 3 bits for up to eight identified patterns, and so forth) to indicate a specific one of the patterns that is identified for the sector. In one embodiment, when the cache controller detects a certain pattern is written to a memory page or line, it sends the way descriptor bits instead of actually writing the data to an external cache or other external memory. When a read transaction to that memory page or line happens, the cache controller can determine from tag bits stored locally that the page contains a certain data pattern, and can then return the data directly, instead of reading from the external memory.

Figure 5:
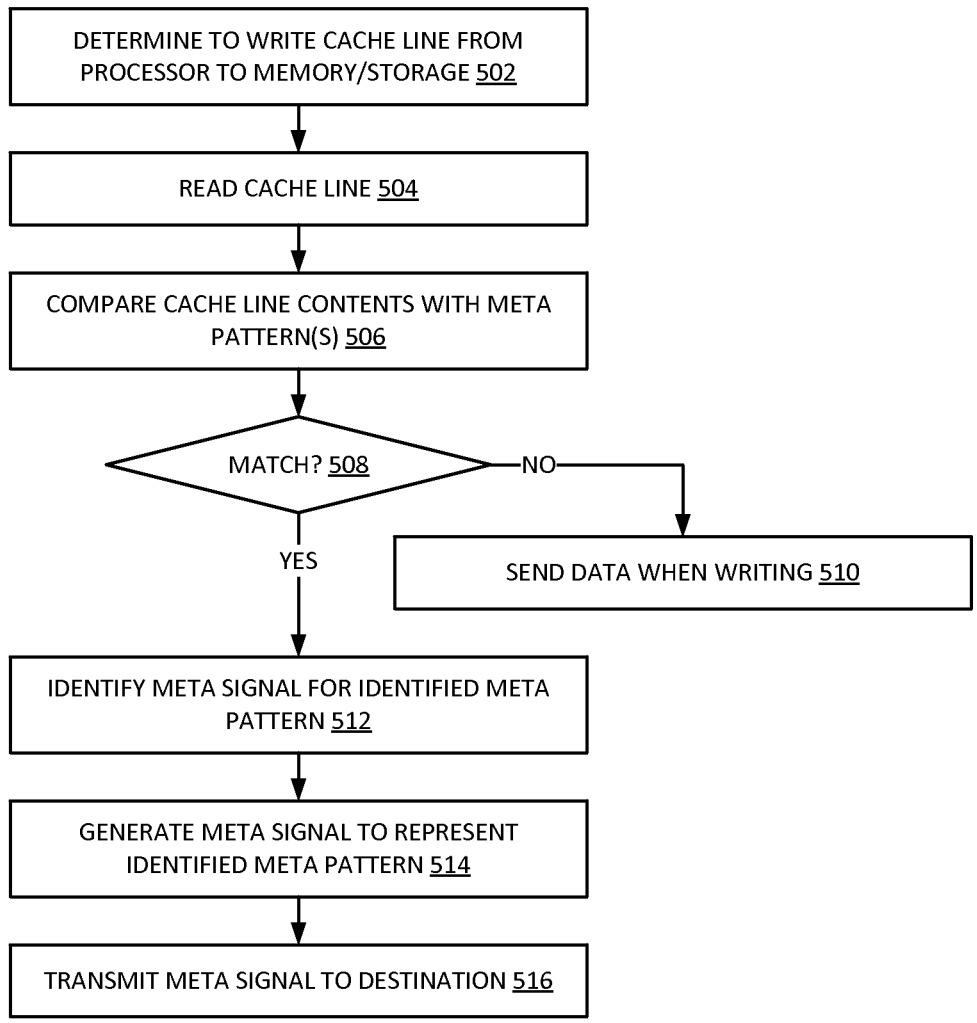
FIG. 5 is a flow diagram of an embodiment of a process for generating a meta signal to represent a cache line bit pattern.

FIG. 5 is a flow diagram of an embodiment of a process for generating a meta signal to represent a cache line bit pattern. In one embodiment, the process for generating a meta signal to represent data is referred to as meta signaling. In one embodiment, the meta signaling occurs only for a memory device used as a cache off-chip from the processor device. In one embodiment, a cache controller determines to write a cache line from a processor to a cache device or other memory device or storage device external to the processor, 502.

The cache controller reads the cache line determined to be written out, 504, and analyzes the bit pattern. In one embodiment, the cache controller compares the cache line contents with known meta pattern(s), 506. In one embodiment, the cache controller keeps tag bits for each cache line written out. In one embodiment, the cache controller inspects for one of multiple different bit patterns. In one embodiment, the cache controller inspects the data for a specific bit pattern (e.g., all zeroes data). If the cache line contents do not match a known pattern, 508 NO branch, the cache controller sends the data when writing the data to the destination device, 510. If the cache controller determines that the contents of the cache line match a known pattern, 508 YES branch, the cache controller can keep a meta signal instead of writing out the data.

In one embodiment, the cache controller identifies a meta signal for the identified meta pattern, 512, for example, if the system tracks multiple different bit patterns. In one embodiment, the cache controller generates the meta signal to represent the identified meta pattern, 514. For example, the cache controller could generate tag information for the cache line. In one embodiment, the meta signal includes a pin or command sent to the external memory device to represent the identified bit pattern. The memory controller transmits the meta signal to the destination device, 516. In one embodiment, the meta signal replaces the need to send any signal at all to the external memory device. In one embodiment, the meta signal replaces the need to send at least part of a cache line to the external memory device.

Figure 6:
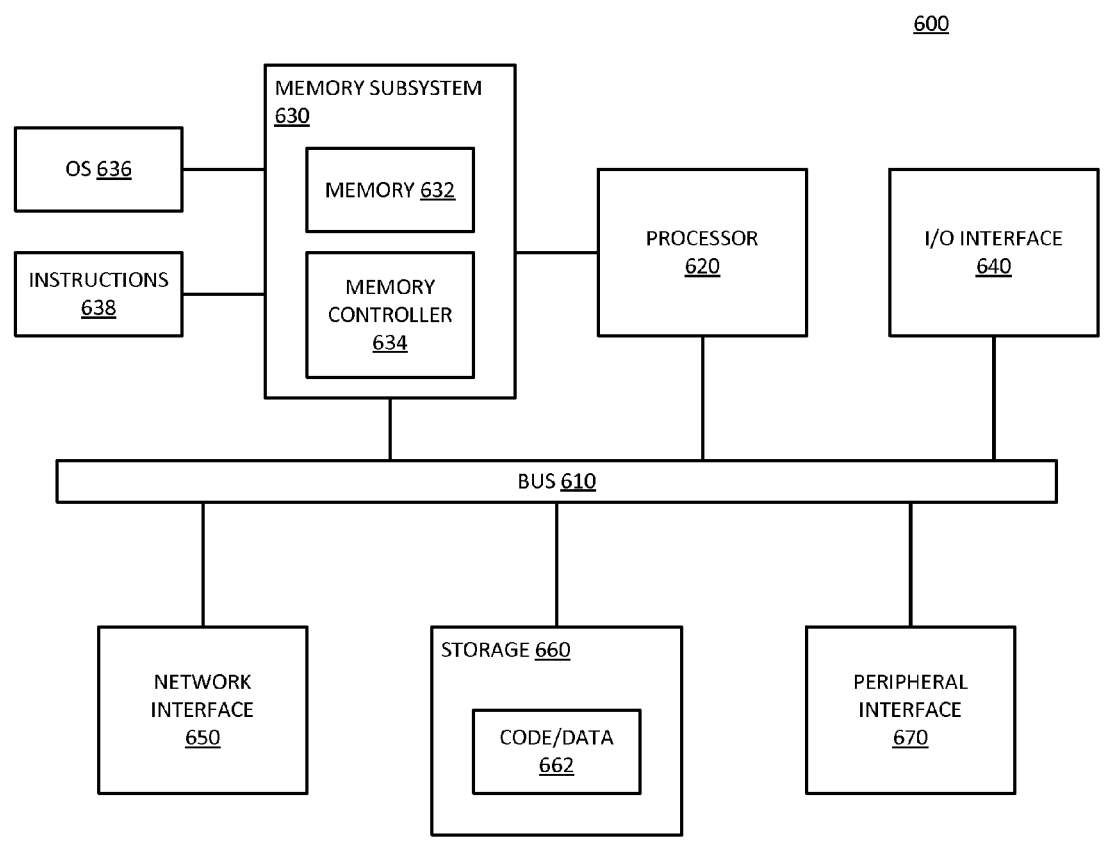
FIG. 6 is a block diagram of an embodiment of a computing system in which generating a meta signal to represents a cache line bit pattern can be implemented.

FIG. 6 is a block diagram of an embodiment of a computing system in which generating a meta signal to represents a cache line bit pattern can be implemented. System 600 represents a computing device in accordance with any embodiment described herein, and can be a laptop computer, a desktop computer, a server, a gaming or entertainment control system, a scanner, copier, printer, routing or switching device, or other electronic device. System 600 includes processor 620, which provides processing, operation management, and execution of instructions for system 600. Processor 620 can include any type of microprocessor, central processing unit (CPU), processing core, or other processing hardware to provide processing for system 600. Processor 620 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 can include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620. Memory subsystem 630 includes memory device 632 where it stores data, instructions, programs, or other items. In one embodiment, memory subsystem includes memory controller 634, which is a memory controller to generate and issue commands to memory device 632. It will be understood that memory controller 634 could be a physical part of processor 620.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 can also correspond to interfaces in network interface 650.

System 600 also includes one or more input/output (I/O) interface(s) 640, network interface 650, one or more internal mass storage device(s) 660, and peripheral interface 670 coupled to bus 610. I/O interface 640 can include one or more interface components through which a user interacts with system 600 (e.g., video, audio, and/or alphanumeric interfacing). Network interface 650 provides system 600 the ability to communicate with remote devices (e.g., servers, other computing devices) over one or more networks. Network interface 650 can include an Ethernet adapter, wireless interconnection components, USB (universal serial bus), or other wired or wireless standards-based or proprietary interfaces.

Storage 660 can be or include any conventional medium for storing large amounts of data in a nonvolatile manner, such as one or more magnetic, solid state, or optical based disks, or a combination. Storage 660 holds code or instructions and data 662 in a persistent state (i.e., the value is retained despite interruption of power to system 600). Storage 660 can be generically considered to be a "memory," although memory 630 is the executing or operating memory to provide instructions to processor 620. Whereas storage 660 is nonvolatile, memory 630 can include volatile memory (i.e., the value or state of the data is indeterminate if power is interrupted to system 600).

Peripheral interface 670 can include any hardware interface not specifically mentioned above. Peripherals refer generally to devices that connect dependently to system 600. A dependent connection is one where system 600 provides the software and/or hardware platform on which operation executes, and with which a user interacts.

In one embodiment, processor 620 includes a cache device (not specifically shown). In one embodiment, system 600 implements a meta signal mechanism to reduce the amount of data transmitted from processor 620 to a destination device associated with the cache. In one embodiment, the cache is an on-chip cache, and the destination device is an off-chip cache. In one embodiment, the cache is an on-chip cache, and the destination device is an off-chip memory device, such as memory 632, or storage device 660. Memory controller 634 can include a cache controller or processor 620 can include the cache controller, which controls the transfer of the data to the destination device. The cache controller analyzes the data of a cache line, identifies it as a known bit pattern, and represents the bit pattern with the meta signal. Thus, the cache controller can indicate the meta signal instead of needing to send at least part of the data.

Figure 7:
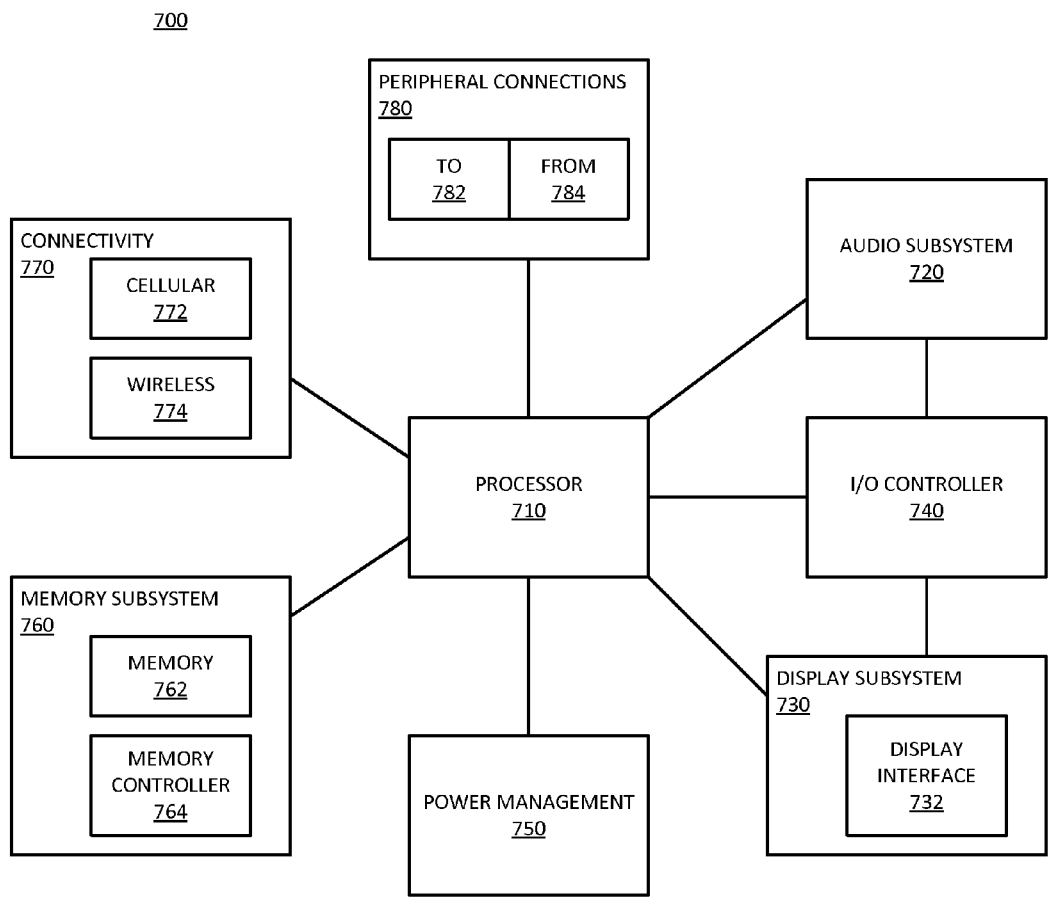
FIG. 7 is a block diagram of an embodiment of a mobile device in which generating a meta signal to represents a cache line bit pattern can be implemented.

FIG. 7 is a block diagram of an embodiment of a mobile device in which generating a meta signal to represents a cache line bit pattern can be implemented. Device 700 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 700.

Device 700 includes processor 710, which performs the primary processing operations of device 700. Processor 710 can include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations can also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of device 700. Additionally, audio output can be provided instead of or in addition to display output. In another example, if display subsystem includes a touchscreen, the display device also acts as an input device, which can be at least partially managed by I/O controller 740. There can also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that can be included in device 700. The input can be part of direct user interaction, as well as providing environmental input to the system to influence its operations (such as filtering for noise, adjusting displays for brightness detection, applying a flash for a camera, or other features). In one embodiment, device 700 includes power management 750 that manages battery power usage, charging of the battery, and features related to power saving operation.

Memory subsystem 760 includes memory device(s) 762 for storing information in device 700. Memory subsystem 760 can include nonvolatile (state does not change if power to the memory device is interrupted) and/or volatile (state is indeterminate if power to the memory device is interrupted) memory devices. Memory 760 can store application data, user data, music, photos, documents, or other data, as well as system data (whether long-term or temporary) related to the execution of the applications and functions of system 700. In one embodiment, memory subsystem 760 includes memory controller 764 (which could also be considered part of the control of system 700, and could potentially be considered part of processor 710). Memory controller 764 includes a scheduler to generate and issue commands to memory device 762.

Connectivity 770 includes hardware devices (e.g., wireless and/or wired connectors and communication hardware) and software components (e.g., drivers, protocol stacks) to enable device 700 to communicate with external devices. The external device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector can allow device 700 to connect to certain peripherals that allow device 700 to control content output, for example, to audiovisual or other systems.

In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, processor 620 includes a cache device (not specifically shown). In one embodiment, system 700 implements a meta signal mechanism to reduce the amount of data transmitted from processor 710 to a destination device associated with the cache. In one embodiment, the cache is an on-chip cache, and the destination device is an off-chip cache. In one embodiment, the cache is an on-chip cache, and the destination device is an off-chip memory device, such as memory 762, or other storage device. Memory controller 764 can include a cache controller or processor 710 can include the cache controller, which controls the transfer of the data to the destination device. The cache controller analyzes the data of a cache line, identifies it as a known bit pattern, and represents the bit pattern with the meta signal. Thus, the cache controller can indicate the meta signal instead of needing to send at least part of the data.

In one aspect, a method for transmitting data with a meta signal includes reading a cache line at a source device to send to a destination device; identifying a bit pattern in bits of the cache line; generating a meta signal to represent the identified bit pattern; and transmitting the meta signal to the destination device in place of at least part of the cache line.

In one embodiment, reading the cache line comprises reading an on-chip cache of a processor chip to send to a memory device off-chip. In one embodiment, identifying the bit pattern comprises identifying the data as all zeroes. In one embodiment, generating the meta signal to represent the identified bit pattern comprises generating a memory access command that indicates a write command specific to the identified bit pattern. In one embodiment, generating the meta signal to represent the identified bit pattern comprises setting a group of one or more signal lines coupling the source device and the destination device to a predetermined value to indicate the bit pattern without sending data over a data bus coupling the source device and the destination device. In one embodiment, transmitting the meta signal to the destination device comprises sending the meta signal to a volatile memory device. In one embodiment, transmitting the meta signal to the destination device comprises sending the meta signal to a nonvolatile storage device.

In one aspect, a central processing unit (CPU) to send data with a meta signal includes an on-chip cache device to store cache lines of data for execution by a processor of the CPU; an interface to an off-chip memory device to store data from the on-chip cache device; and a memory controller to determine to write data from the on-chip cache to the off-chip memory device, the memory controller to read a cache line from the on-chip cache device, identify a bit pattern in bits of the cache line, generate a meta signal to represent the identified bit pattern, and transmit the meta signal to the off-chip memory device in place of at least part of the cache line.

In one embodiment, the memory controller is to read a cache line of a multi-level cache. In one embodiment, the memory controller is to identify the bit pattern as all zeroes. In one embodiment, the memory controller is to generate a memory access command as the meta signal that indicates a write command specific to the identified bit pattern. In one embodiment, the memory controller is to generate a by setting a group of one or more signal lines of the interface to a predetermined value to indicate the bit pattern without sending data over a data bus of the interface. In one embodiment, the memory controller is to transmit the meta signal to a volatile memory device. In one embodiment, the memory controller is to transmit the meta signal to a nonvolatile storage device.

In one aspect, an electronic device including a CPU to send data with a meta signal includes: a central processing unit (CPU), including an on-chip cache device to store cache lines of data for execution by a processor of the CPU; an interface to an off-chip memory device to store data from the on-chip cache device; and a memory controller to determine to write data from the on-chip cache to the off-chip memory device, the memory controller to read a cache line from the on-chip cache device, identify a bit pattern in bits of the cache line, generate a meta signal to represent the identified bit pattern, and transmit the meta signal to the off-chip memory device in place of at least part of the cache line; an external memory device coupled to the interface; and a touchscreen display coupled to generate a display based on data accessed from the on-chip cache device.

In one embodiment, the memory controller is to identify the bit pattern as all zeroes. In one embodiment, the memory controller is to generate a memory access command as the meta signal that indicates a write command specific to the identified bit pattern. In one embodiment, the memory controller is to generate a by setting a group of one or more signal lines of the interface to a predetermined value to indicate the bit pattern without sending data over a data bus of the interface. In one embodiment, the memory controller is to transmit the meta signal to a volatile memory device. In one embodiment, the memory controller is to transmit the meta signal to a nonvolatile storage device.

In one aspect, an article of manufacture comprising a computer readable storage medium having content stored thereon, which when executed by a computing device performs operations for transmitting data with a meta signal, including: reading a cache line at a source device to send to a destination device; identifying a bit pattern in bits of the cache line; generating a meta signal to represent the identified bit pattern; and transmitting the meta signal to the destination device in place of at least part of the cache line.

In one embodiment, the content for reading the cache line comprises content for reading an on-chip cache of a processor chip to send to a memory device off-chip. In one embodiment, the content for identifying the bit pattern comprises content for identifying the data as all zeroes. In one embodiment, the content for generating the meta signal to represent the identified bit pattern comprises content for generating a memory access command that indicates a write command specific to the identified bit pattern. In one embodiment, the content for generating the meta signal to represent the identified bit pattern comprises content for setting a group of one or more signal lines coupling the source device and the destination device to a predetermined value to indicate the bit pattern without sending data over a data bus coupling the source device and the destination device. In one embodiment, the content for transmitting the meta signal to the destination device comprises content for sending the meta signal to a volatile memory device. In one embodiment, the content for transmitting the meta signal to the destination device comprises content for sending the meta signal to a nonvolatile storage device.

In one aspect, an apparatus for transmitting data with a meta signal includes means for reading a cache line at a source device to send to a destination device; means for identifying a bit pattern in bits of the cache line; means for generating a meta signal to represent the identified bit pattern; and means for transmitting the meta signal to the destination device in place of at least part of the cache line.

In one embodiment, the means for reading the cache line comprises means for reading an on-chip cache of a processor chip to send to a memory device off-chip. In one embodiment, the means for identifying the bit pattern comprises means for identifying the data as all zeroes. In one embodiment, the means for generating the meta signal to represent the identified bit pattern comprises means for generating a memory access command that indicates a write command specific to the identified bit pattern. In one embodiment, the means for generating the meta signal to represent the identified bit pattern comprises means for setting a group of one or more signal lines coupling the source device and the destination device to a predetermined value to indicate the bit pattern without sending data over a data bus coupling the source device and the destination device. In one embodiment, the means for transmitting the meta signal to the destination device comprises means for sending the meta signal to a volatile memory device. In one embodiment, the means for transmitting the meta signal to the destination device comprises means for sending the meta signal to a nonvolatile storage device.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
reading a cache line at a source device to send to a destination device, the source device and destination device coupled by multiple signal lines including data signal lines and one or more meta signal lines separate from the data signal lines, the one or more meta signal lines dedicated for sending of a meta signal;
identifying a bit pattern in bits of the cache line;
generating a meta signal to represent the identified bit pattern; and
transmitting the meta signal to the destination device in place of at least part of the cache line, including setting the one or more meta signal lines to indicate the identified bit pattern instead of sending all bits of the cache line on the data signal lines.

2. The method of claim 1, wherein reading the cache line comprises reading an on-chip cache of a processor chip to send to a memory device off-chip.

3. The method of claim 1, wherein identifying the bit pattern comprises identifying the data as all zeroes.

4. The method of claim 1, wherein transmitting the meta signal to the destination device comprises sending the meta signal to a volatile memory device.

5. The method of claim 1, wherein transmitting the meta signal to the destination device comprises sending the meta signal to a nonvolatile memory device.

6. The method of claim 1, wherein transmitting the meta signal to the destination device comprises sending the meta signal for only a portion of the cache line.

7. A central processing unit (CPU), comprising:
a cache device to store cache lines of data for execution by a processor of the CPU;
an interface to an off-chip memory device to store data from the cache device, the interface including data signal lines and one or more meta signal lines separate from the data signal lines, the one or more meta signal lines dedicated for sending of a meta signal; and
a memory controller to determine to write data from the cache to the off-chip memory device, the memory controller to read a cache line from the cache device, identify a bit pattern in bits of the cache line, generate a meta signal to represent the identified bit pattern, and transmit the meta signal to the off-chip memory device in place of at least part of the cache line including to set the one or more meta signal lines to indicate the identified bit pattern instead of transmission of all bits of the cache line on the data signal lines.

8. The CPU of claim 7, wherein the memory controller is to identify the bit pattern as all zeroes.

9. The CPU of claim 7, wherein the memory controller is to transmit the meta signal to a volatile memory device.

10. The CPU of claim 7, wherein the memory controller is to transmit the meta signal to a nonvolatile storage device.

11. The CPU of claim 7, wherein the cache device includes an on-chip cache.

12. The CPU of claim 7, wherein the cache device includes an off-chip cache.

13. The CPU of claim 7, wherein the cache device includes an off-chip cache of a multi-level cache, and wherein the memory controller is to read a cache line of the off-chip cache to send to the off-chip memory device.

14. The CPU of claim 7, wherein the memory controller to transmit the meta signal comprises to send the meta signal for only a portion of the cache line.

15. An electronic device comprising:
a central processing unit (CPU), including
an on-chip cache device to store cache lines of data for execution by a processor of the CPU;
an interface to an off-chip memory device to store data from the on-chip cache device, the interface including data signal lines and one or more meta signal lines separate from the data signal lines, the one or more meta signal lines dedicated for sending of a meta signal; and
a memory controller to determine to write data from the on-chip cache to the off-chip memory device, the memory controller to read a cache line from the on-chip cache device, identify a bit pattern in bits of the cache line, generate a meta signal to represent the identified bit pattern, and transmit the meta signal to the off-chip memory device in place of at least part of the cache line including to set the one or more meta signal lines to indicate the identified bit pattern instead of transmission of all bits of the cache line on the data signal lines;
an external memory device coupled to the interface; and
a touchscreen display coupled to generate a display based on data accessed from the on-chip cache device.

16. The electronic device of claim 15, wherein the memory controller is to identify the bit pattern as all zeroes.

17. The electronic device of claim 15, wherein the memory controller is to transmit the meta signal to a volatile memory device.

18. The electronic device of claim 15, wherein the memory controller is to transmit the meta signal to a nonvolatile storage device.

19. The electronic device of claim 15, wherein the memory controller to transmit the meta signal comprises to send the meta signal for only a portion of the cache line.

\* \* \* \* \*